United States Patent [19]

Köhler et al.

[11] Patent Number: 5,071,905

[45] Date of Patent: Dec. 10, 1991

[54] MIXTURES OF POLYARYLENE SULFIDES, GLASS FIBERS AND SILANES CONTAINING NITRO GROUPS

[75] Inventors: Burkhard Köhler; Hans-Detlef Heinz, both of Krefeld, Fed. Rep. of Germany; Hans-Joachim Traenckner, Merksem, Belgium; William Bushong, Pittsburgh, Pa.

[73] Assignee: Bayer Aktiengesellschaft, Leverkusen, Fed. Rep. of Germany

[21] Appl. No.: 603,226

[22] Filed: Oct. 25, 1990

[30] Foreign Application Priority Data

Nov. 9, 1989 [DE] Fed. Rep. of Germany ....... 3937333

[51] Int. Cl.$^5$ ............................ C08K 3/40; C08K 9/06
[52] U.S. Cl. .................................. 524/494; 523/213; 523/214

[58] Field of Search ................ 524/188, 494; 523/213, 523/214

[56] References Cited

U.S. PATENT DOCUMENTS

| | | | |
|---|---|---|---|
| 4,337,182 | 6/1982 | Needham | 523/213 |
| 4,528,310 | 7/1985 | Blackwell | 524/188 |
| 4,703,074 | 10/1987 | Izutsu et al. | 524/451 |
| 4,917,957 | 4/1990 | Nitoh et al. | 524/188 |

*Primary Examiner*—Paul R. Michl
*Assistant Examiner*—Peter Szekely
*Attorney, Agent, or Firm*—Connolly and Hutz

[57] ABSTRACT

The invention relates to mixtures of polyarylene sulfides, glass fibers and silanes containing nitro groups which are distinguished by good mechanical properties (for example relatively high flexural strength or outer fiber strain).

3 Claims, No Drawings

MIXTURES OF POLYARYLENE SULFIDES, GLASS FIBERS AND SILANES CONTAINING NITRO GROUPS

Polyarylene sulfides (PAS) are known (cf. for example U.S. Pat. No. 3,354,129, Ep 171 021). They are inert, high-temperature-resistant thermoplastics which can be filled to a high degree, for example with glass fibers or other inorganic fillers. The use of these polymers, particularly polyphenylene sulfide (PPS), is increasing in fields hitherto reserved for thermosets.

PPS has unsatisfactory mechanical properties for certain applications in the injection-molding field. Accordingly, it has proved to be of advantage to improve PPS/glass fiber compounds in their mechanical properties by blending with other thermoplastics.

Thus, blends of polyarylene sulfides with polycarbonates are known (cf. for example JP 51-59952, EP 104 543, U.S. Pat. No. 4,021,596).

However, the property profile of such blends is still not entirely satisfactory for certain applications.

In addition, it is known that PPS can be modified in its properties by blending with maleic imides. In most cases, it is desirable to branch PPS either by reacting PPS with maleic imides under oxidative conditions (cf. for example JP 02 1876) or by reacting PPS with compounds containing at least three maleic imide groups and one triazine ring (Cf. for example Jp 202162 and EP 105 639). Other patents relate to blends of polyarylene sulfides containing polysulfide sulfone blocks and maleic imides (EP 275 991).

Another method of improving mechanical properties of PPS compounds is to use reagents which influence the glass fiber/matrix adhesion.

It has surprisingly been found that mixtures of polyarylene sulfides, particularly polyphenylene sulfide (PPS), with glass fibers show improved flexural strength where small quantities of silanes containing nitro groups are added. The present invention relates to mixtures of A) 90 to 20% by weight and preferably 80 to 20% by weight polyarylene sulfides, preferably polyphenylene sulfides, having a melt viscosity of 5 to 1000 Pa.s, as measured at a shear rate of 1000 s$^{-1}$ and at a temperature of 306°C., B) 0.01 to 5% by weight and preferably 0.1 to 2% by weight silanes containing nitro groups corresponding to general formula I, II or III, preferably to formula I or II and, more preferably, to formula I:

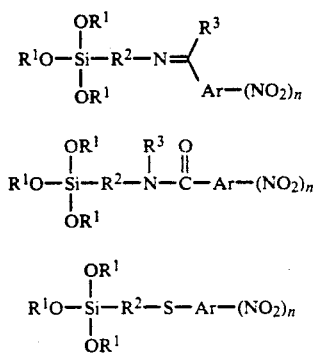

in which the $R^1$'s independently of one another may be the same or different and represent $C_{1-4}$ alkyl or $C_{6-14}$ aryl, preferably phenyl, $R^2$ represents $C_{1-22}$ alkylene, preferably $C_3$ alkylene or phenylene and, more preferably, 1,3-propanediyl, $R^3$ represents hydrogen, $C_{1-22}$ alkyl (preferably methyl) or $C_{6-14}$ aryl (preferably phenyl), more preferably hydrogen, Ar is a $C_{6-14}$ aryl radical, optionally substituted one or more times by—independently of one another —halogen or $C_{1-12}$ alkyl and n is an integer of 1 to 3, and C) 9.99 to 79.99% by weight and preferably 20 to 60% by weight glass fibers and/or other inorganic or organic fillers and additives.

Preferred compounds of formula I according to the invention are
3-(4-nitrobenzylideneamino)-1-triethoxysilanopropane,
3-(3-nitrobenzylideneamino)-1-triethoxysilanopropane,
3-(2-nitrobenzylideneamino)-1-triethoxysilanopropane,
3-(2,4-dinitrobenzylideneamino)-1-triethoxysilanopropane, 1-triethoxysilanopropane,
(4-nitroacetophenone)-3-triethoxysilanopropaneimine and
(2-nitroacetophenone)-3-triethoxysilanopropaneimine.

Preferred compounds of formula II according to the invention are
2-nitro-N-(3-triethoxysilanopropyl)-benzamide,
4-nitro-N-(3-triethoxysilanopropyl)-benzamide,
4-nitro-N-methyl-N-(3-triethoxysilanopropyl)-benzamide,
3,5-dinitro-N-(3-triethoxysilanopropyl)-benzamide,
3,5-dinitro-N-methyl-N-(3-triethoxysilanopropyl)-benzamide,
2,4-dinitro-N-(3-triethoxysilanopropyl)-benzamide and
2,4-dinitro-N-methyl-N-(3-triethoxysilanopropyl)-benzamide.

Preferred compounds of formula III according to the invention are (4-nitrophenyl)-(3-triethoxysilanopropyl)-sulfide and (2,4-dinitrophenyl)-(3-triethoxysilanopropyl)-sulfide.

The additives of formula I according to the invention may be obtained in known manner, for example from the corresponding silane containing amino groups and a nitro-aryl aldehyde in the presence of toluene as solvent and entraining agent for the azeotropic removal of water (Organikum, VEB-Verlag, IIth Edition, 1972, pages 414 et seq.).

The additives of formula II according to the invention may be obtained, for example, from the corresponding silane containing amino groups and a nitrobenzoyl chloride by the Schotten-Baumann method (Organikum, VEB-Verlag, 11th Edition, page 446).

The additives corresponding to formula III may be obtained, for example, from 3-mercapto-1-triethoxysilano-propane and a nitrochlorobenzene by reaction in apolar aprotic solvents in the presence of bases.

Polyarylene sulfides in the context of the invention are, for example, the linear and branched polycondensates obtainable by reaction of aromatic dihalogen compounds, particularly p-dichlorobenzene with sulfur donors, for example sodium sulfide (cf. for example U.S. Pat. No. -A 3,354,129, EP-A 171 021).

Glass fibers according to the invention are commercial glass fibers 1.5 to 20 μm and preferably 1 to 10 μm in diameter which have optionally been sized in the usual way (silanized).

The glass fibers may be used in the form of endless fibers and/or in lengths of 0.05 to 10 mm and preferably in lengths of 0.1 to 2 mm.

As rovings (endless fibers), the glass fibers may be used in processes for the production of reinforced unidirectional composites.

Commercial glass beads (for example Ballotini glass beads) may optionally be used as fillers instead of the glass fibers.

Other fillers or additives according to the invention are, for example, mica, talcum, silica flour, metal oxides and sulfides (for example $TiO_2$, $ZnO$, $ZnS$), graphite, carbon black, fibers (for example of quartz, carbon), carbonates (for example $MgCO_3$, $CaCO_3$) or sulfates (for example $CaSO_4$, $BaSO_4$), metal powders, fibers, spangles or flakes.

Other typical additives include pigments, mold release agents, E waxes, flow aids, nucleating agents or stabilizers.

The mixtures according to the invention may additionally contain maleic imides of di- or polyamines.

The mixtures according to the invention of polyarylene sulfides, silanes containing nitro groups and known commercial fillers and reinforcing materials may be produced by compounding methods known per se in single-screw or multiple-screw extruders, preferably degassing extruders, for example ZSK extruders, suitable kneaders, such as BUSS-KO kneaders, or agglomerators (for example Pallmann/Condux).

The silanes containing nitro groups may first be applied to the fillers or may be added during compounding of the polyarylene sulfide melt.

These mixtures may also be prepared from the individual components by methods known from powder mixing technology either in dosed form or in admixture.

Powder mixtures of this type may be prepared, for example, in cone screw mixers, tumble mixers, turbine mixers, Rhonrad mixers or similar mixers.

The present invention also relates to the use of the mixtures according to the invention as molding compounds for the production of moldings, semi-finished products, films and fibers.

EXAMPLES

Example 1

Synthesis of 3-(4-nitrobenzylideneamino)-1-triethoxysilano-propane 66.3 g 3-amino-1-triethoxysilanopropane, 45.3 g 4-nitrobenzaldehyde and 500 ml toluene are mixed and the resulting mixture is heated for 2 hours on a water separator. The mixture is filtered and the filtrate is concentrated, giving 107.2 g of product.

Example 2

A PPS compound of 45 parts by weight glass fibers, 3 parts by weight microtalcum and 52 parts by weight PPS is mixed.

Commercially available glass fibers sized with a polyurethane filmformer and an aminosilane coupling agent (57916®, a product of Bayer AG) are used as the glass fibers.

Example 3

A PPS compound of 45 parts by weight glass fibers, 3 parts by weight microtalcum and 52 parts by weight PPS is mixed with 1 part by weight 3-(4-nitrobenzylideneamino)-1-triethoxysilanopropane.

Example 4

A PPS compound of 45 parts by weight glass fibers, 3 parts by weight microtalcum and 52 parts by weight PPS is mixed with 5 parts by weight rutile.

Example 5

A PPS compound of 45 parts by weight glass fibers, 3 parts by weight microtalcum and 52 parts by weight PPS is mixed with 5 parts by weight of a mixture of 90% by weight rutile and 10% by weight 3-(nitrobenzylamino)-1-triethoxy-silanopropane.

Example 6

A PPS compound of 45 parts by weiqht glass fibers, 3 parts by weight microtalcum, 52 parts by weight PPS and 0.5 part by weight 3-(3,5-dinitrobenzoylamino)-1-triethoxy-silanopropane is mixed.

The described starting materials were added in dosed form to a degassing twin-screw extruder. The temperature during compounding was 330°C.

The cylindrical granulate obtained after compounding was processed to corresponding moldings on which the mechanical properties shown in the following Table were determined:

| Molding of Example No. | Flexural strength (N/mm$^2$) | Outer fiber strain | Flexural modulus (N/mm$^2$) |
|---|---|---|---|
| 2 | 260 | 1.8 | 15000 |
| 3 | 291 | 1.93 | 15226 |
| 4 | 199 | 1.35 | 14800 |
| 5 | 212 | 1.42 | 14600 |
| 6 | 297 | 2.0 | 14300 |

Comparison of Example 2 with Example 3 or 6 and comparison of Example 4 with Example 5 shows that the additives according to the invention produce a distinct increase in flexural strength and other mechanical properties.

We claim:
1. Mixtures of
A) 90 to 20% by weight polyarylene sulfides having a melt viscosity of 5 to 1000 Pa.s, as measured at a shear rate of 1000 s$^{-1}$ and at a temperature of 306° C.,
B) 0.01 to 5% by weight silanes containing nitro groups corresponding to general formula I, II or III

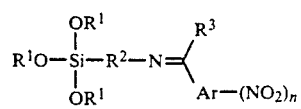

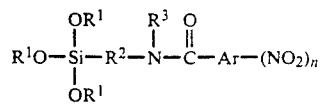

-continued

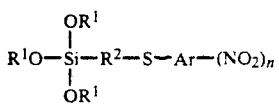
III in which
the R's independently of one another may be the same or different and represent $C_{1-4}$ alkyl or $C_{6-14}$ aryl,
$R^2$ represents $C_{1-22}$ alkylene,
$R^3$ represents hydrogen, $C_{1-22}$ alkyl or $C_{6-14}$ aryl, Ar is a $C_{6-14}$ aryl radical, optionally substituted one or more times by - independently of one another-halogen or $C_{1-12}$ alkyl and
n is an integer of 1 to 3,
and
C) 9.99 to 79.99% by weight glass fibers and/or other inorganic or organic fillers and additives.

2. The use of the mixtures claimed in claim 1 for the production of rigid moldings.

3. Moldings produced from the molding compounds claimed in claim 1.

* * * * *